Oct. 24, 1961
N. CAPELLARO ET AL
3,005,585
SHORT-CUT MULTIPLICATION MECHANISM FOR
TEN-KEY CALCULATING MACHINES
Filed Sept. 26, 1956
5 Sheets-Sheet 1
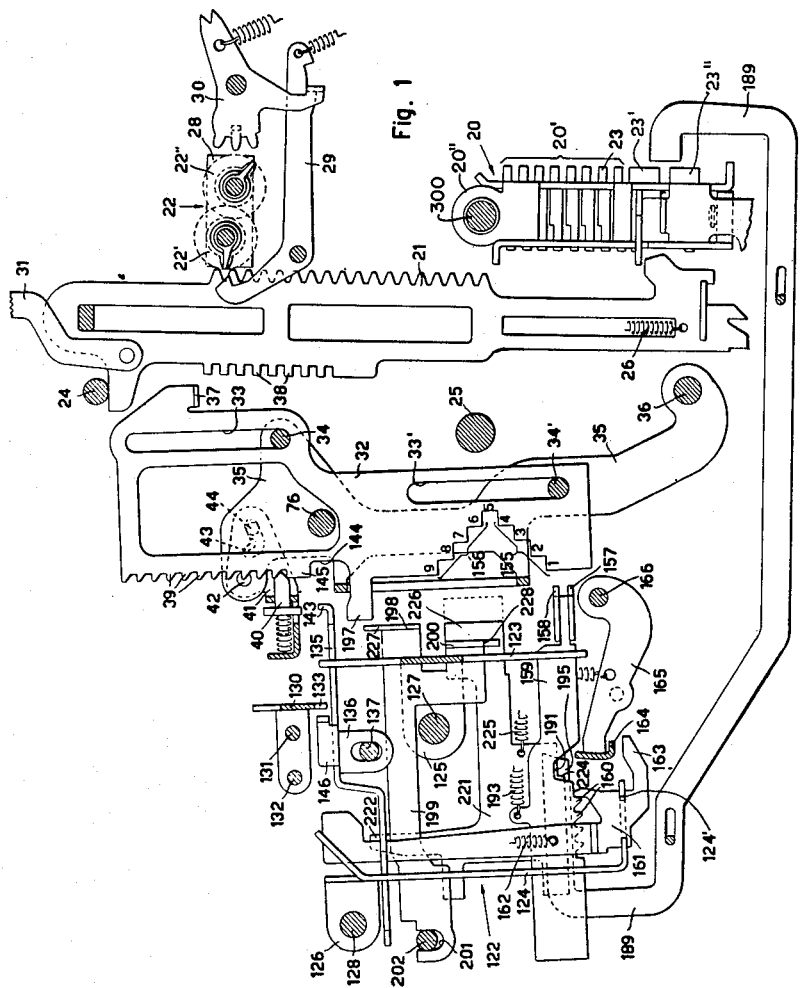
INVENTORS
NATALE CAPELLARO
& TERESIO CASSINO
BY
Kenyon & Kenyon
ATTORNEYS

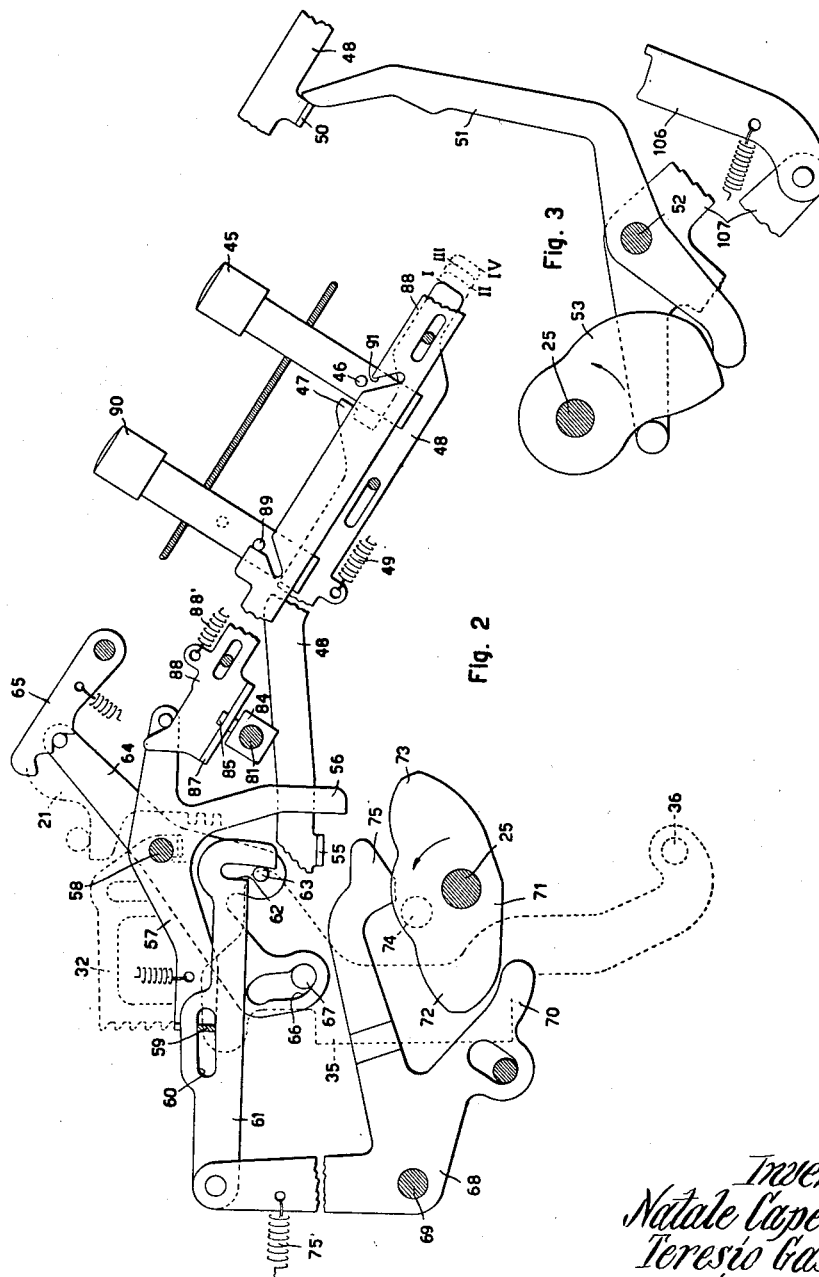

Oct. 24, 1961
N. CAPELLARO ET AL
3,005,585
SHORT-CUT MULTIPLICATION MECHANISM FOR
TEN-KEY CALCULATING MACHINES
Filed Sept. 26, 1956
5 Sheets-Sheet 3
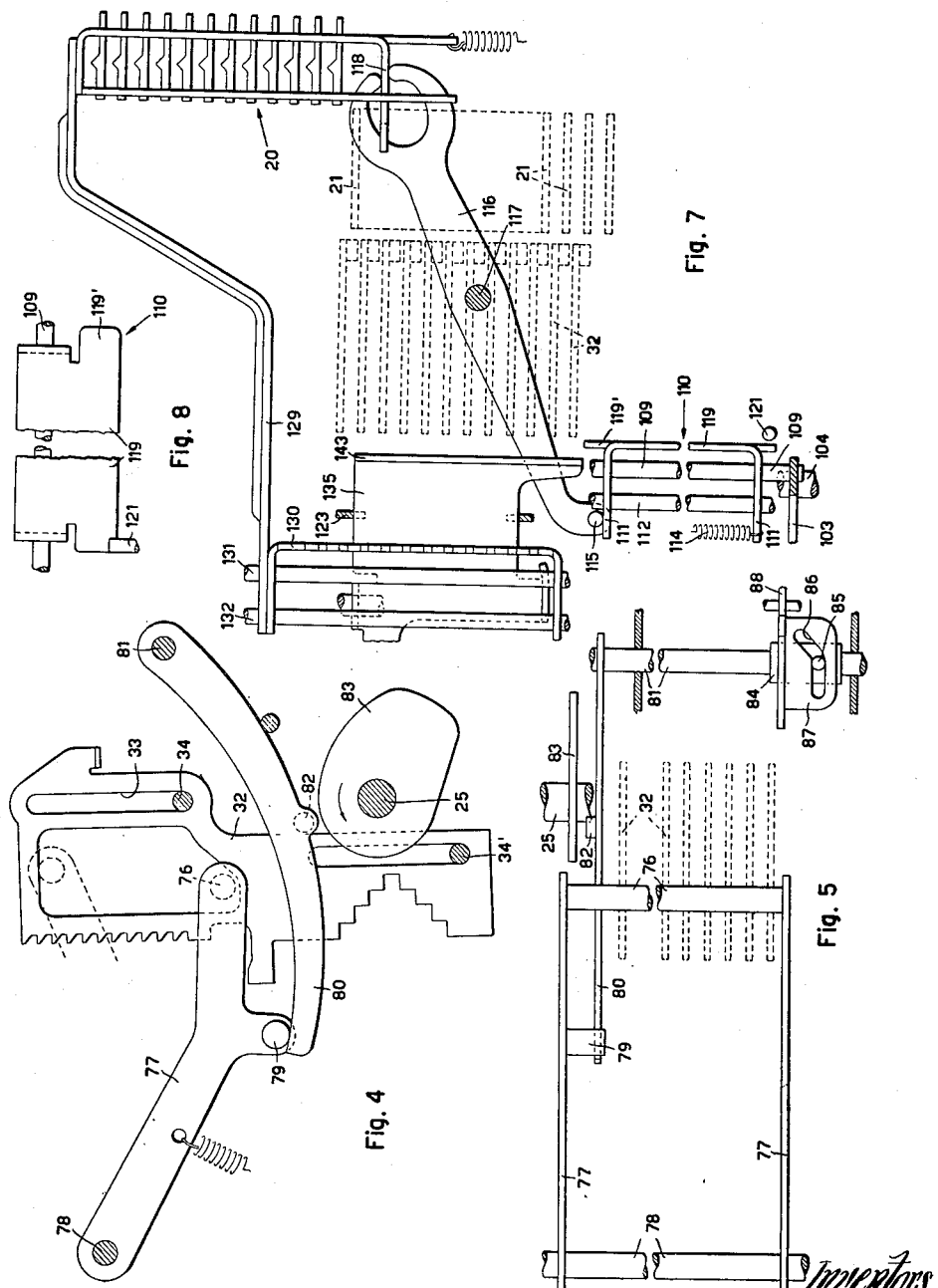

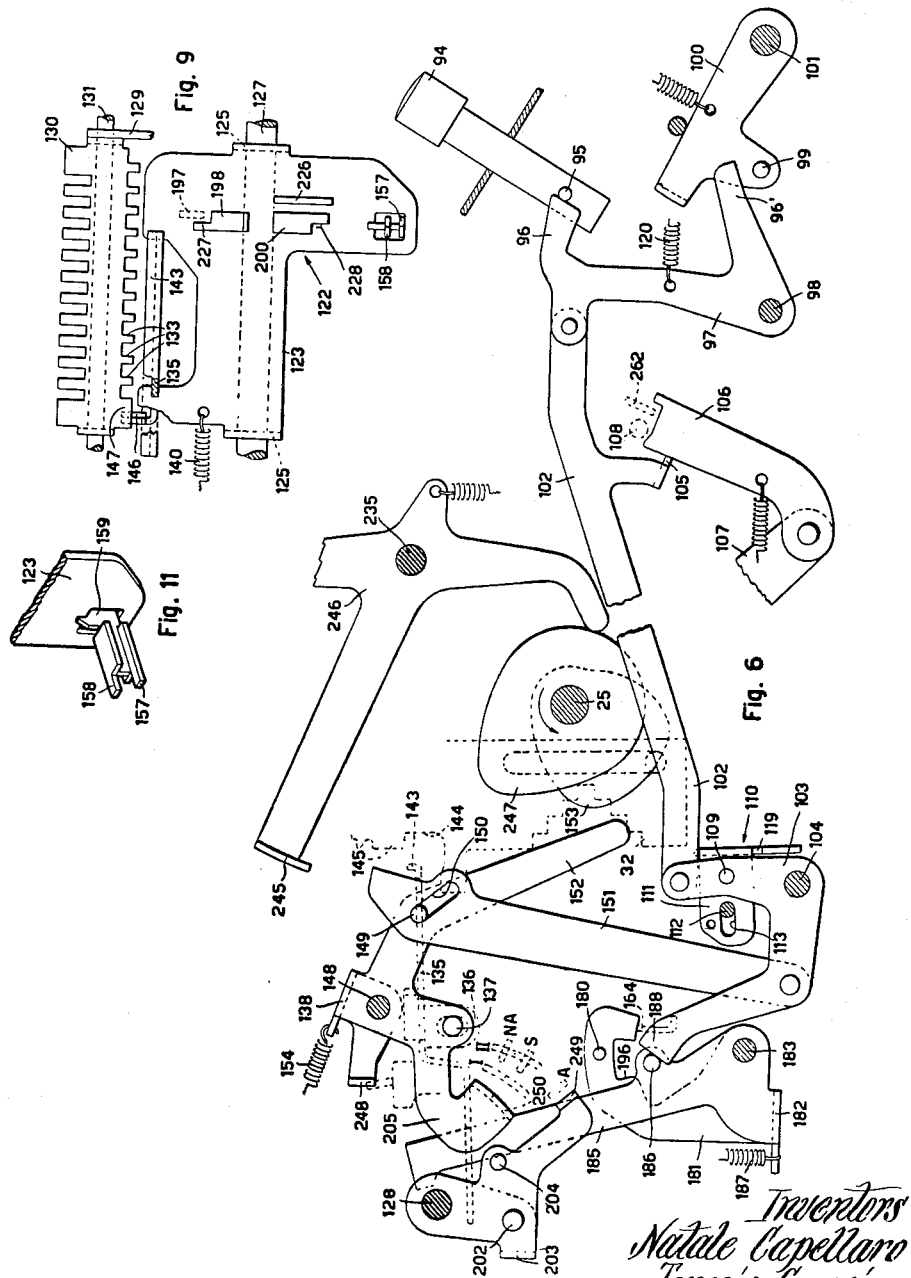

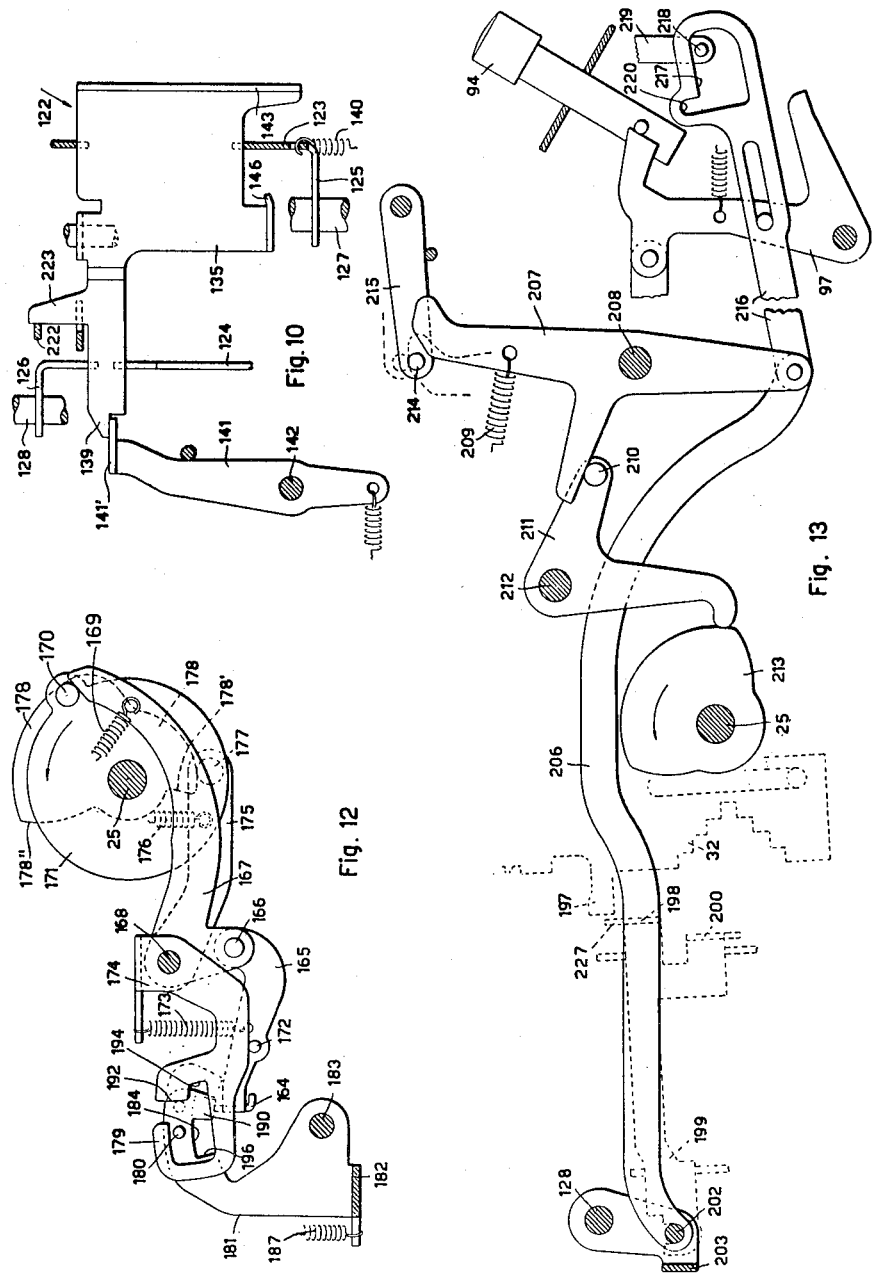

United States Patent Office 3,005,585
Patented Oct. 24, 1961

3,005,585
SHORT-CUT MULTIPLICATION MECHANISM FOR TEN-KEY CALCULATING MACHINES
Natale Capellaro and Teresio Gassino, Ivrea, Italy, assignors to Ing. C. Olivetti & C., S.p.A., Ivrea, Italy, a corporation of Italy
Filed Sept. 26, 1956, Ser. No. 612,206
Claims priority, application Italy Oct. 6, 1955
11 Claims. (Cl. 235—63)

The present invention relates to calculating machine of the type adapted to effect automatic multiplication by repeated additions and/or subtractions.

A known machine of this type comprises a multiplier storage mechanism and a sensing device cooperating therewith for sequentially sensing the denominational storing elements thereof and setting a cycle counting device according to the differential travel made in sensing the individual storing element, the storage mechanism not being cleared as an incident to the operation of multiplication. To this end the sensing device is adapted in each denominational order to travel through an extent proportional to the multiplier digit sensed. However, by following the short-cut method of multiplication the multiplier digits requiring calculation according to said method will require for each digit a number of machine cycles differing from the digit itself. In this case difficulties arise in the control or use of the counting device, whereby additional mechanisms and controls are necessary.

The purpose of the invention is to simplify the multiplication mechanism and to improve its general operation.

We provide, therefore, a short-cut multiplication mechanism comprising a multiplier storage mechanism having a storing element in each denominational order, said storing element being provided with two stepped portions, one representing the multiplier digits requiring short-cut multiplication, the other representing the remaining multiplier digits, one of said portions being ascending, the other being descending. We further provide a cycle counting device, and a sensing device cooperating with said storage mechanism for sequentially sensing said storing elements and setting said cycle counting device according to the differential travel made in sensing the stepped portions of the individual storing element. Therefore, upon sensing one of said portions said sensing device will be adapted to travel through an extent proportional to the complement to a fixed number, for example the ten complement, of the multiplier digit sensed, while travelling through an extent proportional to the multiplier digit itself upon sensing the other portion.

It will thus be apparent that the counting device settable by the sensing device may be used without any particular provision for controlling the cycling mechanism of the machine.

Further objects, features and advantages of the invention will become apparent from the following description of a preferred embodiment thereof, taken in conjunction with the accompanying drawings in which:

FIG. 1 is a partial left-hand longitudinal view through a calculating machine embodying the multiplication mechanism according to the invention, with reference to an observer facing the front of the machine;

FIG. 2 is a partial left-hand longitudinal view through the multiplier storage mechanism controlling device;

FIG. 3 is a left-hand longitudinal view through the amount set-up means restoring device;

FIG. 4 is a partial left-hand longitudinal view through the zeroizing device for the multiplier storage mechanism;

FIG. 5 is a plan view of the zeroizing mechanism shown in FIG. 4;

FIG. 6 is a partial left-hand longitudinal view through the multiplication starting and stopping mechanisms;

FIG. 7 is a fragmentary plan view of the multiplication stopping mechanism shown in FIG. 6;

FIG. 8 is a fragmentary front elevation of the multiplication stopping mechanism of FIG. 6;

FIG. 9 is a fragmentary front elevation of the multiplication mechanism of FIG. 1;

FIG. 10 is a fragmentary plan view of the multiplication mechanism of FIG. 1;

FIG. 11 is a perspective right-hand front view of a detail of FIG. 9;

FIG. 12 is a fragmentary left-hand longitudinal view through the cycle counting device;

FIG. 13 is a partial left-hand longitudinal view through the register controlling device.

General description

The machine shown in the drawings is of the well known ten-key keyboard type comprising an amount set-up means generally indicated by the numeral 20 (FIG. 1), a register 22 and a set of vertically reciprocable differential actuators 21 controlled by the amount set-up means 20 to operate the register 22. The amount set-up means 20 comprises an indexable mechanism, such as a pin basket 20′, and a transversely movable carriage 20″ slidably mounted on a stationary transverse shaft 300. In the present embodiment the pin basket 20′ is arranged on the carriage 20″ itself to form a single unit usually referred to as the pin carriage, which is transversely shiftable to alter its cooperative relationship with the register 22. The pin carriage 20 carries nine horizontal rows of stop pins 23 indexable by the keyboard, not shown, and corresponding to the digits from 0 to 8. The register 22 is of the type comprising two sets of intermeshing register wheels 22′ and 22″ supported by a cradle frame 28 reversible through 180°. Associated with each order of the register is a transfer lever 29 and a transfer actuator 30.

Each differential actuator 21 is connected through a link 31 to a type carrier not shown in the drawings but disclosed in the copending application Serial No. 369,059.

Setting up the multiplier

In performing a multiplication the multiplier is set up in the pin carriage 20 as any other amount. The multiplier is then transferred by means of the actuator 21 to a storage mechanism cooperating therewith.

Arranged behind the actuator 21 is a set of slides 32, one slide 32 being provided for each order of the pin carriage 20 (see also FIG. 7). Each slide 32 is movably mounted by means of two vertical slots 33 and 33′ on two rods 34 and 34′ secured at one end to a side plate 35 pivotally mounted on a stationary shaft 36. By swinging the side plate 35 clockwise a bent-over lug 37 of each slide 32 is engageable with a set of teeth 38 of the corresponding actuator 21.

Each slide 32 is further provided with teeth 39 engageable with a corresponding finger 40 of a set of fingers resiliently carried by a bail 41. The latter pivots about a pin 42 secured to the side plate 35 and is formed with a cam slot 43 cooperating with a pin 44 secured to the machine frame, not shown in the drawings.

The slides 32 form the denominational storing elements of the multiplier storage mechanism.

The multiplier set up in the pin carriage 20 is transferred to the slides 32 on operation of a special key 45 (FIG. 2). This key is adapted to start a machine cycle which, as concerns the register 22, is a non-add cycle. To this end the key 45 controls both a motor bar, such as the motor bar 68 described in the United States Patent 2,821,342 and a function conditioning slide, such as the slide 152 described in the copending application Serial No. 392,660 (Patent No. 2,954,921, issued Oct. 4, 1960).

Moreover, the key 45 carries a pin 46 adapted to arrest a projection 47 of a slide 48 urged forwards by a spring 49. Normally the slide 48 rests by means of a bent-over lug 50 (FIG. 3) upon the upper arm of a lever 51 pivoted at 52 on the machine frame and cooperating with a cam 53 secured to a shaft 25. This shaft is the main operating shaft of the machine and is caused by the motor, not shown in the drawings, to make one full revolution at each machine cycle.

The slide 48 is a variable function conditioning slide of the type described in the Italian Patent 491,469, granted March 5, 1954, with reference to the slide 221 shown in FIG. 6, this slide traveling through a variable extent according to the key depressed. More particularly, on being arrested in the position marked I (FIG. 2) the slide 48 conditions the machine for back spacing the pin carriage 20 and non printing; on being arrested in position II it conditions the machine for non printing; on being arrested in position III it permits printing. Finally, upon depressing the key 45 the pin 46 which was previously adapted to arrest the slide 48 in position III, now arrests the slide 48 in the position IV, wherein the slide 48 permits printing and conditions the multiplier set up in the pin carriage to be transferred to the slides 32, as will be hereinafter described.

The slide 48 is formed with a lug 55 adapted to engage the lower arm 56 of a lever 57 pivotally mounted on a shaft 58 and formed with a bent-over lug 59 riding in a slot 60 of a lever 61. The latter is formed at its forward end with a hook 62 adapted to engage a pin 63 secured to a lever 64 pivoted on the shaft 58. The lever 64 is adapted to be held in two different positions by a positioning lever 65 and is formed at its rearward end with a cam slot 66 engaging a pin 67 secured to the side plate 35.

The lever 61 is connected to the upper arm of a lever 68 pivoted at 69 and having an arm 70 cooperating with a cam 71 secured to the main shaft 25. The cam 71 is formed with two cam portions 72 and 73 adapted to sequentially engage the arm 70 during a single revolution of the shaft 25. A pin 74 secured to the cam 71 is provided for engaging a further arm 75 of the lever 68 to positively restore the latter upon completion of the machine cycle.

The mode of operation of the described mechanism is as follows:

Upon depression of the key 45 the main shaft 25 is rotated counter clockwise, FIG. 3, through a single cycle.

The cam 53 (FIG. 3) releases the lever 51 and the slide 48 will be moved forwards by the spring 49 (FIG. 2) until after having engaged the arm 56 by means of the lug 55 substantially in the position III, it is arrested before it contacts the pin 46 in the position IV. During this machine cycle the multiplier set up in the pin carriage 20 will be printed like any other amount set up in the keyboard.

Moreover, at the beginning of the cycle the cam portion 72 rocks the lever 68 clockwise, thus moving the lever 61 forwards. Since the pin 63 is normally out of engagement with the hook 62, as shown in FIG. 2, the lever 61 will move idly. At the same time, the lug 55 on being moved forward with the slide 48, will engage the arm 56 and rock the lever 57 counterclockwise, thus lowering, through the lug 59, the lever 61. However, the cams 53 (FIG. 3) and 71 (FIG. 2) are shaped in such a manner that the hook 62 in moving forward will already have passed the pin 63 when being lowered. Therefore, the hook 62 will not be enabled to engage the pin 63 until completion of the action of the cam portion 72 and restoration of the lever 68 by a spring 75'.

Finally, during the first half of the cycle a restoring bail 24 (FIG. 1) is lifted by a cam of the main shaft 25, not shown in the drawings and the actuators 21 are moved upwards by their springs 26 until arrested according to the multiplier set up.

At the beginning of the second half of the cycle, that is when the actuators 21 have assumed a position representing the multiplier set up, the cam portion 73 (FIG. 2) rocks the lever 68 again. This time the hook 62 already engages the pin 63 and the lever 64 will be rocked counterclockwise, causing the same slot 66 engaging in the pin 67 to rock the side plate 35 towards the actuators 21 (FIG. 1) about the shaft 36. Since the slides 32 move bodily with the side plate 35, each one of the lugs 37 enters a notch between the teeth 38 of the corresponding actuator 21. The positioning lever 65 (FIG. 2) holds the lever 64 in its counterclockwise rocked position and the slides 32 are thus held in engagement with the actuators 21. It should be remarked that during the forward movement of the side plate 35 the stationary pin 44 (FIG. 1) rocks the bail 41 clockwise about the pin 42, whereby the positioning fingers 40 release the slides 32.

During the second half of the cycle the bail 24 restores the actuators 21. Each slide 32 will thus be moved downwards along with the associated differential actuator through a number of steps corresponding to the digit represented by the actuator itself, whereby the multiplier will be transferred to the slides 32.

Upon completion of the cycle the pin 74 (FIG. 2) restores the lever 68, whereby the hook 62 will rock the lever 64 clockwise and the slides 32 will be disengaged from the actuators 21, while being reengaged by the positioning fingers 40 (FIG. 1).

As will be described later, the multiplier thus transferred to the slides 32 remains stored therein even after completion of the multiplication, the slides being cleared only upon setting up a new multiplier, during the first half of the cycle started by the key 45.

To this end the slides 32 (FIG. 4) are engageable by a restoring bar 76 secured to an arm 77 pivoted on a shaft 78. Secured to the arm 77 is a pin 79 cooperating with a lever 80 bodily connected to a shaft 81 and provided with a pin 82 engageable by a cam 83 secured to the main shaft 25. Normally the pin 82 is out of the plane of the cam 83 (FIG. 5). Secured to the shaft 81 is a hub 84 carrying a stud 85 cooperating with a cam slot 86 formed in a lug 87 bent from a slide 88. The slide 88 is urged forwards by a spring 88' (FIG. 2) and is normally arrested by a pin 89 secured to a key 90.

The mechanism for clearing the storage mechanism operates as follows:

Upon depressing the key 45, the pin 46 besides controlling the travel of the slide 48, engages an inclined slot 91 of the slide 88 and moves the latter backwards. The cam slot 86 (FIG. 5) of the lug 87 will thus shift the hub 84 transversely along with the shaft 81 and the lever 80, thereby moving the pin 82 into the path of the cam 83. During the ensuing machine cycle the cam 83 will rock the lever 80 clockwise (FIG. 4), thus lifting the restoring bar 76 into the position shown with broken lines. The slides 32 will thus be returned to their upper normal position whereupon they will be ready to engage the actuators 21 for receiving a new multiplier.

*Setting up the multiplicand*

The multiplier having been set up, printed and stored in the manner described, the multiplicand will now be set up in the pin carriage 20 and a multiplication key 94 (FIG. 6) depressed to start the operation of multiplication. A mechanism is provided to prevent the operation from being started both if the expected product exceeds the capacity of the register and if no multiplicand has been set.

To this this end, the key 94 is provided with a pin 95 cooperating with the upper arm 96 of a lever 97 pivoted at 98. The forward arm 96' of the lever 97 is adapted to engage a pin 99 of an arm 100 pivoted at 101 and controlling the usual motor bar of the machine.

The lever 97 is connected through a link 102 to a lever 103 pivoted at 104. The link 102 is formed with a lug 105 cooperating with an arm 106 linked to a lever 107 controlled by the cam 53 (FIG. 3). On being moved upwards the arm 106 is adapted to engage a pin 108 connected to the pin carriage 20, thus restoring the latter. However, the lug 105 is capable of rocking the arm 106 clockwise to prevent it from engaging the pin 108, whereby the pin carriage 20 will not be restored at the end of the cycle. As is well known in the art, the same occurs in a conventional repeat operation.

The lever 103 supports a rod 109 (FIGS. 6 and 7) extending transversely through the machine. Pivotally supported on the rod 109 is a bail 110 each arm 111 of which is slidably mounted by means of a slot 113 on a stationary rod 112. The bail 110 is furthermore transversely slidable on the rods 109 and 112 (FIG. 7) and is urged by a spring 114 to contact a pin 115 secured to a lever 116. The latter is pivoted at 117 and engages an extension 118 of the pin carriage 20.

The beam 119 of the bail 110 is arranged below the lower end of the slides 32 (FIG. 6), but is off-set both toward the rear (see FIG. 6) and the higher orders (see FIG. 7) with respect to said slides.

The mode of operation of the mechanism will now be described.

Upon setting up the multiplier, a slide 32 is differentially lowered for each digit thereof beginning from the lowest order, and at the end of the machine cycle the pin carriage 20 is returned to normal in the usual manner. Upon thereafter setting up the multiplicand, the pin carriage 20 travels again step by step towards the higher orders. By means of the lever 116 the bail 110 is thus moved through the same number of steps towards the lower orders, aligning its beam 119 laterally (as seen in FIG. 7) with a corresponding number of slides 32.

On depression of the multiplication key 94 (FIG. 6) a spring 120 urges the lever 97 clockwise whereby, through the link 102, it urges the lever 103 clockwise and the bail 110 forwards.

If the sum of the number of digits of the multiplicand set up in the pin carriage and of the multiplier stored in the slides 32 exceeds the total number of slides 32 and thus the capacity of the portion of the actuating and register mechanisms directly controlled by the pin carriage 20, then the bail 110 has been shifted too many steps toward the lower orders (FIG. 7) and the beam 119 abuts against at least one slide 32 out of zero position. The lever 97 (FIG. 6) is thus prevented from rotating clockwise and the arm 100 does not operate the motor bar of the machine.

If, on the contrary, said sum is less than or equal to the total number of slides 32, the beam 119 will be allowed to move forward and the arm 100 will actuate the motor bar, starting a machine cycle. At the same time the arm 96 will lock the pin 95 in depressed position.

However, since the capacity of the register 22 is one order greater than that of the slides 32 (see FIG. 7, showing a number of actuators 21 exceeding the number of slides 32 one unit), the multiplication should not be prevented from being performed if the sum of the digits of the multiplicand and multiplier exceeds the number of slides 32 one unit, provided the highest significant digit of the multiplier is less than five. This latter condition is a consequence of the short-cut method of multiplication followed by the machine, according to which the multiplier digits from five to nine require the pin carriage 20 to be advanced one additional step for multiplying the multiplicand by ten, as is well known to those skilled in the art.

To this end the right hand end of the beam 119 (FIG. 8) is formed with a narrowed extension 119' adapted to be arrested, during the forward movement of the beam, only by a slide 32 storing a digit from five to nine. Therefore, if the sum of the digits of the multiplicand and multiplier exceeds the number of slides 32 one unit and the highest significant digit of the multiplier is less than five, on depression of the key 94 the extension 119' will pass below the slide 32 of said digit and multiplication will be started as in the case described above.

If no multiplicand has been set up prior to depressing the key 94, the bail 110 will not have been shifted transversely from the position shown in FIG. 7 and the beam 119 will be arrested by a fixed pin 121 (FIGS. 7 and 8), thus preventing the multiplication from being started.

In the following description it will be assumed that the factors of multiplication have always been correctly set up.

*General control of machine operation during multiplication*

The multiplication key 94 is adapted to start the operation of multiplication which is performed fully automatically under the control both of the function conditioning means invariably operated by the key 94 and of the variable multiplier stored in the storage mechanism 32.

As concerns the functions invariably controlled by the key 94, it has already been described that on depression of the key the lever 97 (FIG. 6) is enabled to rock clockwise, thus operating the arm 100 which actuates the motor bar of the machine. Moreover, it will be seen that the lug 105 in moving forward rocks the arm 106 clockwise, preventing it from actuating the pin 108 and thus from restoring the pin carriage 20. The motor bar will remain actuated and the pin carriage restoring mechanism will remain disabled as long as the key 94 will remain locked in depressed position.

To control machine functions according to the multiplier set up, the slides 32 are sensed by a suitable sensing mechanism.

To this end there is provided behind the slides 32 a sensing carriage 122 (FIGS. 1, 9 and 10) made of two plates 123 and 124 rigidly connected together and slidably mounted by means of two pairs of lugs 125 and 126 on two transverse shafts 127 and 128, respectively.

Slidably mounted on two further transverse rods 131 and 132 (FIG. 7) is a bail 130 rigidly connected by means of a bar 129 to the pin carriage 20 and thus adapted to move bodily therewith. The bail 130 is formed with a set of notches 133 (FIG. 9) distanced apart one unit of transverse spacing of the pin carriage 20.

A sensing plate 135 (FIGS. 1, 7 and 10) is longitudinally slidable on the carriage 122 and is provided with a slotted lug 136 (FIG. 1) housing a pin 137 carried by a bail 138 (FIG. 6) pivotally mounted on a stationary shaft 148. Under the action of a spring 140 (FIG. 10) urging the carriage 122 toward the higher orders an extension 139 of the plate 135 normally contacts a lug 141' of a lever 141 pivoted at 142.

The plate 135 is formed with a transverse sensing lug 143 (FIG. 1) arranged behind a recess 144 formed in the slides 32 and normally embracing all the slides 32 but that of the units order (FIG. 7).

The plate 135 is further formed with a lug 146 (FIGS. 1, 9 and 10) adapted to engage, upon being moved forward, one of the notches 133 of the bail 130 (FIG. 9), thus connecting the carriage 122 to the bail 130. However, if the plate 135 is moved forward when the pin carriage 20 is in its position of rest, the lug 146 is arrested by a portion 147 of the bail 130.

Returning now to the bail 138 (FIG. 6), a pin 149 secured thereto engages a slot 150 formed in an arm 151 linked to the lever 103. Moreover, an arm 152 of the bail 138 is adapted to cooperate with a cam 153 carried by the main shaft 25 and is normally held by the arm 151 in a position spaced apart from the cam 153.

On depression of the multiplication key 94 (FIG. 6), the lever 103 is rocked clockwise by the link 102, thus moving the arm 151 upwards. The arm 152 will now be permitted to be rocked counterclockwise by a spring 154 until contacting the cam 153. During this movement the pin 137 of the bail 138 moves the plate 135 forwards, enabling the lug 146 (FIG. 9) to engage one of the notches 133 according to the number of steps made by the pin carriage 20 when setting up the multiplicand. Therefore, the sensing carriage 122 will be variably connected to the pin carriage 20 and will then be adapted to move bodily therewith, the extension 139 (FIG. 10) disengaging from the lug 141' upon the forward movement of the plate 135.

Controlling the number of cycles

As mentioned hereinabove, the multiplication is performed according to the short-cut method of repeated additions and subtractions. To accordingly control operation of the machine each slide 32 (FIG. 1) is provided with two opposed stepped portions formed as stairs 155 and 156. The descending stair 155 (as seen when viewed from the right) represents the digits one to five, while the ascending stair 156 represents the digits five to nine. The height of each step of the two stairs is equal to the spacing of the teeth 39.

The two stairs 155 and 156 cooperate with two sensing fingers 157 and 158 carried by a counting slide 159 longitudinally movable on the carriage 122. The sensing finger 157 normally lies in the vertical plane of the slide 32 of units order, while the sensing finger 158 is off-set half space toward the higher orders (FIGS. 9 and 11) and is vertically spaced apart from the finger 157 a distance equal to one step of the stairs 155, 156 (FIG. 1).

The slide 159 is provided with counting teeth 160 spaced apart a distance corresponding to the horizontal depth of the steps of the stairs 155 and 156. The forward tooth 160 is normally engaged by a pawl 161 movable in a slot of a horizontal lug 124' of the rear plate 124 of the carriage 122 and urged upwards by a spring 162.

The teeth 160 as well as a projection 163 of the pawl 161 are engageable by a bail 164 secured to an arm 165 linked at 166 (FIG. 12) to a lever 167 pivotally mounted on a stationary shaft 168. A spring 169 urges the lever 167 into contact with a stud 170 of a disc 171 fastened to the main shaft 25. Under the urge of a spring 173 a stud 172 of the arm 165 contacts a lever 174 pivoted on the shaft 168. A forward arm 175 of the lever 174 carries a stud 177 resting on a cam 178 secured as well to the main shaft 25, the arm 175 being urged counterclockwise by a spring 176. A rearward hook shaped arm 179 of the lever 174 cooperates with a pin 180 secured to an arm 181 of a bail 182 pivotally mounted on a stationary shaft 183. The arm 181 is formed with a recess 184 adapted to receive the bail 164. A further arm 185 (FIG. 6) of the bail 182 carries a pin 186 normally resting upon an extension 188 of the lever 103, the bail 182 being urged clockwise by a spring 187.

The bail 164 (FIG. 1) is adapted to engage the front end of an extension 195 of a slide 189 which upon being moved rearwards sets a zero stop 23' and a spacing stop 23" of the pin carriage 20 to space the pin carriage one step. As is well known in the art, this operation causes the multiplicand set up in the pin carriage to be multiplied by ten.

During each cycle of the main shaft 25 the stud 170 (FIG. 12) rocks the lever 167 clockwise, moving the arm 165 and the bail 164 backwards, while the arm 175 is urged by its spring 176 to follow the shape of the cam 178.

However, during normal machine cycles the lever 174 is prevented by the pin 180 from rotating counterclockwise, while an appendage 190 of the arm 181 prevents the bail 164 from moving upwards and entering a recess 191 (FIG. 1) of the slide 159, whereby the bail 164 is moved backwards idly.

Upon depression of the multiplication key 94 the extension 188 (FIG. 6) of the lever 103 releases the pin 186 and enables the bail 182 to rock clockwise until its pin 180 (FIG. 12) is arrested by a projection 192 of the lever 174. At the same time the appendage 190 moves out of the path of the bail 164.

At the beginning of the ensuing machine cycle the step 178' of the cam 178 enables the lever 174 to rock counterclockwise, moving the bail 164 downwards. The bail will thus engage the projection 163 (FIG. 1), lowering the pawl 161 and disengaging the counting slide 159. The latter will now be moved forward by its spring 193 until its sensing finger 157 is arrested by one of the steps of the stairs 155 and 156, advancing thus a number of spaces corresponding to the digit represented by the sensed slide 32. More particularly, said number will be equal to said digit if the latter is one to four, and it will be equal to the complement to a fixed number, namely, to the ten complement of said digit if the latter is five or more.

The following portion 178" of the cam 178, at about midcycle, racks the arm 175 clockwise, whereby the pin 180 is enabled to fall into a recess 194 of the lever 174, thus latching the latter in its clockwise rocked position as long as the arm 181 remains in its clockwise rocked position. Consequently, during the remainder of the current and during the next following cycles, the bail 164 will be released and elevated but not lowered and the pawl 161 will be permitted to reengage the teeth 160 (FIG. 1).

However, since during each machine cycle the stud 170 rocks the lever 167 clockwise and moves the lever 165 backwards, the bail 164 will each time engage a tooth 160 (FIG. 1) and return the counting slide 159 step by step toward its normal position, the pawl 161 retaining the slide 159 after each step. The sensing cycle ensuing the depression of the key 94 also is the first multiplier counting cycle because when the bail 164 starts moving backwards, after having been enabled to move downwards by the step 178' (FIG. 12) of the cam 178, the counting slide 159 will already have sensed the slide 32. When the counting slide 159 has been returned to a position one step before its position of rest, the bail 164 will be permitted to enter the recess 191, thus further moving upwards. On being thereupon moved backwards the bail 164 will return the slide 159 to normal and furthermore engage the extension 195 and move the slide 189 backwards, thus causing the pin carriage 20 to be shifted one space toward the higher orders. Since the sensing carriage 122 moves bodily with the pin carriage 20, the sensing finger 157 will be shifted into the plane of the slide 32 of the tens order.

Moreover, on being moved backwards, the bail 164, which is now located within the recess 184 (FIG. 12) as permitted by recess 191 (FIG. 1), engages the edge 196 thereof and rocks the arm 181 counterclockwise, whereby the pin 180 will release the recess 194. During the next following machine cycle the lever 174 will be permitted to rock counterclockwise as during the first machine cycle ensuing the depression of the key 94, and the bail 164 will be caused to engage the projection 163 (FIG. 1), releasing the counting slide 159 again and enabling it to sense the slide 32 of the tens order.

It will thus be apparent that the number of machine cycles to be performed for each multiplier digit depends upon the number of spaces through which the counting slide 159 advances on sensing the corresponding slide 32.

Moreover, it will be readily appreciable that the slides 32 are thus adapted to determine said number of cycles without being restored, whereby upon completion of the multiplication the slides 32 will still store the multiplier.

Controlling the add-subtract mechanism

According to the short-cut method of multiplication followed by the machine, for the multiplier digits from five to nine the add-subtract mechanism of the machine has to be operated to reverse the register 22 in order to make repeated subtractions instead of additions. This reversal is controlled by the slides 32 according to their individual position.

To this end each slide 32 (FIG. 1) is formed with a projection 197 adapted to alternately cooperate with two sensing lugs 198 and 200 carried by a sensing slide 199 longitudinally movable on the sensing carriage 122. The two sensing lugs 198 and 200 are located at different heights, so that according to whether the slide 32 stores a digit one to four or five to nine either the lug 198 or the lug 200 will be arrested by the projection 197 on the forward movement of the slide 199. However, since the lug 200 is located one space behind the lug 198, the slide 199 will be enabled to advance one space more if arrested by means of the lug 200. Finally, if the slide 32 is at zero the projection 197 assumes the position shown with broken lines in FIG. 9 and is not capable of arresting the slide 199.

A slot 201 formed in the slide 199 (FIG. 1) engages a shaft 202 fastened to a bail 203 (FIG. 6) pivotally mounted on the shaft 128 and carrying a pin 204 adapted to cooperate with an arm 205 of the bail 138. During the normal cycles of the machine the pin 204 will be arrested by the edge of the arm 205.

The shaft 202 is connected by means of a link 206 (FIG. 13) to a lever 207 pivoted at 208 and urged by a spring 209 to contact a stud 210 of a lever 211. The latter is pivoted at 212 and cooperates with a cam 213 secured to the main shaft 25. The upper end of the lever 207 cooperates with a stud 214 of a lever 215 adapted to control by known means the reversing mechanism of the register 22, as described in the copending application Serial No. 392,660 in connection with the lever 126' (FIG. 7).

Connected to the lever 207 is a link 216 which in turn is pin-and-slot connected to the lever 97 and is formed with an aperture 217 wherein a pin 218 is located. The latter is carried by a link 219 which upon being lowered conditions the register engaging mechanism to engage the register 22 with the differential actuators 21 for an amount entering operation. The link 219 may be connected to the function conditioning slide 142 described in the copending application Serial No. 392,660.

On depression of the multiplication key 94 (FIG. 13) the lever 97 rocks clockwise and moves the link 216 downwards, whereby the link 219 will condition the register engaging mechanism for operation. Moreover, the bail 138 (FIG. 6) rocks counterclockwise and moves the arm 205 out of the path of the pin 204.

During the first part of each machine cycle the cam 213 (FIG. 13) enables the lever 207 to be rocked counterclockwise by its spring 209, whereby the shaft 202 will be moved forwards together with the sensing slide 199. If the slide 199 is arrested by means of the sensing lug 198, the sensed slide 32 storing a digit one to four, the lever 207 will not be rocked enough to raise the lever 215, whereby the register will remain in its normal adding position. If, however, the slide 199 is arrested by means of its lug 200, the sensed slide 32 storing a digit five to nine, the lever 207 will be rocked so far to raise the lever 215 into its upper position to condition the register 22 to be reversed for subtraction. Finally, if the slide 199 is not arrested by the projection 197, the sensed slide 32 being at zero, the slide 199 will make its maximum travel and the link 216 places a recess 220 of the aperture 217 above the pin 218. The latter is thus enabled to immediately return to normal and the register 22 will not be engaged with the actuators 21 during this cycle.

It will thus be apparent that according to the position taken by the sensing slide 199 on sensing a slide 32, the machine will perform adding cycles if the multiplier digit is one to four, subtracting cycles if the multiplier digit is five to nine and non add cycles if the multiplier digit is zero, the number of cycles of each series depending upon the counting slide 159.

Additional cycle

It has already been mentioned that for each multiplier digit from five to nine the series of subtract cycles must be followed by an additional add cycle in the next higher order for multiplying the multiplicand by ten.

To this end the sensing carriage 122 (FIG. 1) supports a further longitudinally movable arresting slide 221 normally resting by means of an upward projection 222 upon a lug 223 (FIG. 10) of the sensing plate 135 and formed with an abutment 224 (FIG. 1) engageable by the bail 164. The slide 221 is further provided with a stop lug 226 spaced apart from the lug 157 (FIG. 9) half space toward the lower orders.

When upon depression of the multiplication key 94 the sensing plate 135 moves forward, its lug 223 (FIG. 10) will release the projection 222, thus permitting the arresting slide 221 to be moved by its spring 225 (FIG. 1) to the position shown with broken lines for the lug 226. Therefore, the latter will be placed with its transverse path interfering with the projection 197 of the slides 32 storing a digit from five to nine. When during the last machine cycle of the series of cycles made for such a slide 32 the bail 164 engages the extension 195 and causes the pin carriage 20 to advance one space, the stop lug 226 moving bodily with the sensing carriage 122 will be laterally arrested by the projection 197 of said slide 32, the carriage 122 having thus been permitted to advance half space only toward the higher orders. However, the pin carriage 20 will advance a full space as usually, because the notches 133 (FIG. 9) of the bail 130 are so wide to permit the corresponding relative movement between the two carriages to take place.

The number of machine cycles to be effected for the slide 32 now sensed will be determined by the sensing finger 158 instead of the sensing finger 157, the former having been placed into the plane of said slide. Since the sensing finger 158 is located one space higher than the sensing finger 157, the number of cycles determined by the counting slide 159 will correspond to a multiplier digit one unit higher than the digit actually stored in the slide 32. Therefore, if the latter stores a digit from one to four, the machine will make one cycle more; if the slide 32 stores a digit from five to eight the machine will make one cycle less. Furthermore, if the slide 32 is at zero its projection 197 will immediately arrest the forward movement of an appendage 227 (FIG. 9) projecting from the sensing lug 198. Consequently, the lever 207 (FIG. 13) will not engage the lever 215 and the link 219 will be lowered. Finally, if the slide 32 is at nine, its projection 197 will lie in the path of a recess 228 (FIG. 9) formed in the sensing lug 200, whereby the sensing slide 199 will be enabled to make its maximum travel. In this case the recess 220 (FIG. 13) will prevent the link 219 from being lowered.

It will thus be apparent that in an order immediately following a multiplier digit equal to or higher than five, the machine will make, according to the four cases described above, the following cycles: one add cycle more; one subtract cycle less; an add cycle; a non add cycle.

During the last cycle of the series of cycles so made the bail 164 (FIG. 1) enters the recess 191 and engages the step 224, moving the arresting slide 221 backwards and releasing the lug 226 from the projection 197, whereby the sensing carriage 122 will be permitted to complete its step toward the higher orders. The half space so made adds now to the adjoining full space normally made by the sensing carriage 122 upon engagement of the extension 195 by the bail 164.

Controlling the printing mechanism

It has already been stated that the multiplier is printed horizontally by means of the usual printing means 31 (FIG. 1) controlled by the differential actuators 21. The same applies to the multiplicand, which will be printed during the first multiplication cycle, the printing mechanism being thereupon disabled until completion of the multiplication. Since the operation of the printing mechanism does not affect the present invention, it will not be described here.

*Last multiplication cycle and stopping the machine*

It has been stated above that upon depression of the multiplication key 94 the arm 152 (FIG. 6) contacts the cam 153. During each multiplication cycle the cam 153 enables the bail 138 to further rotate counterclockwise until the sensing plate 135 is arrested by the teeth 39 or the portion 145 of at least one slide 32. In this case the bail 138 holds the upper end of the arm 151 out of the path of a lug 245 of a lever 246 pivoted at 235 and controlled by a main shaft operated cam 247.

Moreover, it has been stated above that during the multiplication cycles the bail 182 is rocked clockwise, whereby the arm 185 will be placed into the path of a lug 248 of the bail 138.

During the last cycle of each series of multiplication cycles the bail 164 engages the edge 196 of the arm 181 and returns the bail 182 to normal, thus releasing the lug 248 from the arm 185. However, as long as during this cycle the sensing plate 135 will be arrested by at least one slide 32 out of zero position, the bail 138 will still be prevented from further rocking counterclockwise. When the sensing carriage 122 is shifted to sense the highest significant digit of the multiplier the transverse lug 143 will face a recess 144 in all the higher orders; when during the last cycle of the series the arm 185 releases the lug 248 the bail 138 will at last be enabled to follow the cam 153 and to be further rocked counterclockwise. Consequently, the arm 151 will be moved into the path of the lug 245 which upon being actuated by the cam 247, will now depress the arm 151 and restore the lever 103 and associated link 102 and lever 97. The arm 96 of the latter will thus unlatch the multiplication key 94 which will be permitted to return to rest, while the arm 100 will release the motor bar, thus stopping the machine.

However, the described mechanism for stopping the machine works only if the last cycle whose operation has just been described is one of a series of adding cycles. If, on the contrary, the last series of multiplication cycles is one of subtract cycles, the two described conditions for stopping the machine, namely the lug 143 sensing the slide 32 of the highest significant order and the bail 164 restoring the bail 182 during the last cycle of the corresponding series of cycles, are supplemented by the additional condition that said series of subtract cycles be followed by one add cycle in the next higher order.

There is therefore provided an additional mechanism for locking the bail 138, said mechanism being effective when the machine makes either subtract or non add cycles. To this end the bail 203 carries a lug 249 adapted to cooperate with a lug 250 of the arm 205.

On depression of the multiplication key 94 the arm 205 takes the position marked I, the sensing plate 135 having been arrested by a slide 32, and during each following machine cycle the bail 203 is rocked to a position corresponding to the travel made by the sensing slide 199 (FIG. 1). If the latter is arrested by means of the addition conditioning sensing lug 198, the lug 249 (FIG. 6) takes the position marked A, wherein it is out of the path of the lug 250. The bail 138 will thus be permitted to rock counterclockwise and to stop the machine as described above. If, however, the slide 199 (FIG. 1) is arrested by means of the subtraction conditioning sensing lug 200 or is not arrested at all, the lug 249 (FIG. 6) will take the positions marked S and NA, respectively, thus preventing the lug 250 from moving to the position marked II. In this case the machine will not be stopped and the additional cycle described above will be caused to be made, during which the slide 32 of the next higher order will be sensed by the sensing lug 158. Since this slide 32 is at zero, its projection 197 will arrest the slide 198 to condition an add cycle, as described hereinbefore. During this cycle the lug 249 will be moved to the position A, thus permitting the machine to be stopped.

During the last machine cycle the bail 138 upon being rocked clockwise restores the sensing plate 135 to normal, thus withdrawing the lug 146 (FIG. 1) from the notch 133 and disengaging the sensing carriage 122 from the pin carriage 20. Moreover, the lug 105 (FIG. 6) releases the arm 106, enabling it to engage the pin 108 and to restore the pin carriage 20. The sensing carriage 122 will be restored concomitantly with the pin carriage 20, the arm 106 being adapted to engage a lug 262 arranged adjacent to the pin 108 and controlling a restoring mechanism for the sensing carriage 122 similar to that for the pin carriage 20.

What we claim is:

1. In a short-cut multiplication mechanism for calculating machines, a multiplier storage mechanism having a storing element in each denominational order, said storing element having two stepped portions, one representing the multiplier digits 5–9 requiring short-cut multiplication, the other representing the remaining multiplier digits 1–4, the one of said portions being ascending, the other being descending; a cycle counting device, and a sensing device cooperating with said storage mechanism for sequentially sensing said storing elements and setting said cycle counting device according to the differential travel made in sensing the stepped portions of the individual storing element, whereby upon sensing the one of said portions said sensing device is adapted to travel an amount proportional to the complement to a fixed number of the multiplier digit sensed, while travelling an amount proportional to the multiplier digit itself upon sensing the other stepped portion.

2. In a short-cut multiplication mechanism for calculating machines, a multiplier storage mechanism having a storing element in each denominational order, said storing element having two stepped portions, one representing the multiplier digits 5–9 requiring short-cut multiplication, the other representing the remaining multiplier digits 1–4, the one of said portions being ascending, the other being descending; a cycle counting device, a sensing device cooperating with said storage mechanism for sequentially sensing said storing elements and setting said cycle counting device according to the differential travel made in sensing the stepped portions of the individual storing element, whereby upon sensing the one of said portions said sensing device is adapted to travel an amount proportional to the complement to a fixed number of the multiplier digit sensed, while travelling an amount proportional to the multiplier digit itself upon sensing the other portion, and means for stepwise returning said settable cycle counting device to normal during each machine cycle according to a constant direction of motion, irrespective of the multiplier digit sensed.

3. In a short-cut multiplication mechanism for calculating machines, a multiplier storage mechanism having a movable storing element in each denominational order, said storing element having two stepped portions, one representing the multiplier digits 5–9 requiring short-cut multiplication, the other representing the remaining multiplier digits 1–4, the one of said portions being ascending, the other being descending; a cycle counting device, a transversely movable sensing carriage, a sensing device movably mounted on said carriage and cooperating with said storage mechanism for sequentially sensing said storing elements to set said cycle counting device according to the differential travel made in sensing the stepped portions of the individual storing element, said sensing device being provided with two distinct sensing fingers spaced apart a distance equal to one step of said stepped portions in the direction of motion of said storing element and equally spaced from said storing element in the direction of sensing movement, said sensing fingers being transversely spaced apart substantially half the distance between two adjacent storing elements and being adapted to alternatively sense said stepped portions, and means on a storing element storing a multiplier digit requiring short-cut multiplication for controlling said carriage to travel through said half distance, whereby the sensing finger offset toward the higher orders with respect to the other sensing finger will substitute for the latter in sensing the storing element and the multiplier digit so sensed will be increased one unit.

4. In a multiplication mechanism as claimed in claim 3, a cam portion on each storing element adapted to indicate the sign character of the machine cycles to be effected for the stored multiplier digits, a second sensing device movably mounted on said sensing carriage and adapted to sequentially sense said cam portions to condition the machine according to the character of the multiplier digit sensed in the individual storing element, and transversely extending means between said second sensing device and said cam portion for enabling the second sensing device to remain unaffected by said sensing finger substitution.

5. In a multiplication mechanism as claimed in claim 3, an arresting element movably mounted on said sensing carriage and transversely spaced one order toward the lower orders from said off-set sensing finger, said arresting element being adapted to be laterally arrested by said means on said storing element storing a multiplier digit requiring short-cut multiplication, and means for stepwise returning said cycle counting device to normal, said returning means being adapted to render said arresting element ineffective upon the last return step of said counting device.

6. In a multiplication mechanism for calculating machines having a cycling mechanism and manual means adapted to start said cycling mechanism, a multiplier storage mechanism having a storing element in each denominational order, a transversely movable sensing carriage, a cycle counting device, a sensing device movably mounted on said sensing carriage and cooperating with said storage mechanism for sequentially sensing said storing elements and setting said cycle counting device according to the multiplier digit sensed in the individual storing element, a sensing plate movably mounted on said sensing carriage and adapted at each machine cycle to simultaneously sense the storing elements of the orders higher than the storing element actually sensed by said sensing device, and means jointly operable by said cycle counting device and said sensing plate for stopping said cycling mechanism upon sensing a clear storing element in all the orders sensed.

7. In a short-cut multiplication mechanism for calculating machines, a multiplier storage mechanism having a storing element in each denominational order, a cycling mechanism, a transversely movable sensing carriage, a cycle counting device, a first sensing device movably mounted on said sensing carriage and cooperating with said storage mechanism for sequentially sensing said storing elements and setting said cycle counting device according to the multiplier digit sensed in the individual storing element, an add-subtract control mechanism, a second sensing device movably mounted on said sensing carriage and adapted to sequentially sense said storing elements to condition said control mechanism according to the character of the multiplier digit sensed in the individual storing element, a third sensing device movably mounted on said sensing carriage and adapted at each machine cycle to simultaneously sense the storing elements of the orders higher than the storing element actually sensed by said first and second sensing device, and an element jointly controlled by said first, second and third sensing device for stopping said cycling mechanism.

8. In a calculating machine, a multiplicand set-up means comprising an indexable mechanism and a transversely movable carriage, a register, differential actuators controlled by said mechanism to operate said register, a multiplier storage mechanism having a storing element in each denominational order, said storing elements being engageable with said actuators and movable thereby out of normal position for storing a significant multiplier digit, a sensing transverse adapted to embrace all said storing elements but normally out of the path of same, said sensing transverse being stepwise transversely movable toward the lower orders under the control of said carriage and being thereby positioned to sense a number of storing elements corresponding to the number of digits of the multiplicand represented by said indexing mechanism, said sensing transverse being movable toward said storing elements to sense same, multiplication starting means, and means controlled by said sensing transverse for preventing operation of said multiplication starting means upon sensing a storing element out of normal position.

9. In a calculating machine as claimed in claim 8, wherein the multiplier digits 5–9 are calculated according to the short-cut method and the storing elements are differentially movable according to the significant multiplier digit stored and are adapted to arrest said sensing transverse when out of normal position, a recess formed in said transverse for preventing the same from being arrested by the storing element representing the highest significant digit of the multiplier when set to represent a multiplier digit 1–4 not requiring the short-cut method.

10. In a short-cut multiplication mechanism for calculating machines, a multiplier storage mechanism having a storing element in each denominational order, said storing element having two stepped portions, one representing the multiplier digits 5–9 requiring short-cut multiplication, the other representing the remaining multiplier digits 1–4, the one of said portions being ascending, the other being descending with increasing digit value, a transversely movable sensing carriage, a cycle counting device, a first sensing device movably mounted on said sensing carriage and cooperating with said storage mechanism for sequentially sensing said storing elements to differentially set said cycle counting device according to the differential travel made in sensing the stepped portions of the individual storing element, said sensing device upon sensing the one of said stepped portions being adapted to travel an amount proportional to the complement to a fixed number of the multiplier digit sensed, while travelling an amount proportional to the multiplier digit itself upon sensing the other portion, a cam portion on each storing element adapted to indicate the sign character of the machine cycles to be effected for the stored multiplier digits, and a second sensing device movably mounted on said sensing carriage and adapted to sequentially sense said cam portions to condition the machine according to the character of the multiplier digit sensed in the individual storing element.

11. In a calculating machine, a multiplicand set-up means comprising an indexable mechanism and a transversely movable carriage, a register, differential actuators controlled by said mechanism to operate said register, and a multiplier storage mechanism having a storing element in each denominational order, said storing elements being engageable with said actuators and movable thereby out of normal position for storing a significant multiplier digit, the combination of a transversely movable member normally out of contact with said storing elements, and means controlled by said carriage for stepwise transversely moving said member toward the lower orders and positioning said member to contact the storing element representing the highest significant multiplier digit.

References Cited in the file of this patent

UNITED STATES PATENTS

| | | |
|---|---|---|
| 1,922,971 | Mez | Aug. 15, 1933 |
| 1,991,806 | Kottmann | Feb. 19, 1935 |
| 2,611,539 | Toorell et al. | Sept. 23, 1952 |
| 2,706,082 | Lydfors | Apr. 12, 1955 |